United States Patent Office 3,369,439
Patented Feb. 20, 1968

3,369,439
MUSICAL SCORE, AND MEANS FOR READING THIS SCORE, PARTICULARLY DESIGNED FOR TEACHING A MUSICAL INSTRUMENT
Ernest Burdet, 39a Ave. des Cerisiers, Pully, Vaud, Switzerland
Filed Aug. 13, 1964, Ser. No. 389,289
Claims priority, application Switzerland, Aug. 15, 1963, 10,087/63; Mar. 11, 1964, 3,105/64
5 Claims. (Cl. 84—483)

The present invention relates to a musical score, characterised by the fact that it is constituted by a strip or band presenting at least one stave traced throughout its length, and by the fact that the notes of music inscribed on the stave are formed by tracks of different lengths according to their value.

The invention likewise relates to apparatus enabling such a score to be read or deciphered, particularly for the teaching of an instrument of music, characterised by the fact that it comprises at least one datum mark placed before the said score, transversely to the stave, and bearing indications characteristic of the various points of actuation of the instrument, arranged on this datum mark in the normal sequence of the notes to which these points correspond, and a mechanism for the driving of the band and of the datum mark at a speed distinctive of the tempo of the piece to be played, the assembly being so arranged as to indicate, by the placing of the passage of the tracks facing the said indications of the datum mark or of the said indications facing the tracks, the point of the instrument to be actuated, and, by the time of this passage, the duration of this actuation.

In one particular form of construction of the invention, the datum mark is stationary and the band is movable.

In another form of construction, it is the band that is stationary and the datum mark that is displaced.

The invention is illustrated, by way of example but not of limitation, by the accompanying drawings, in which.

Figure 1:
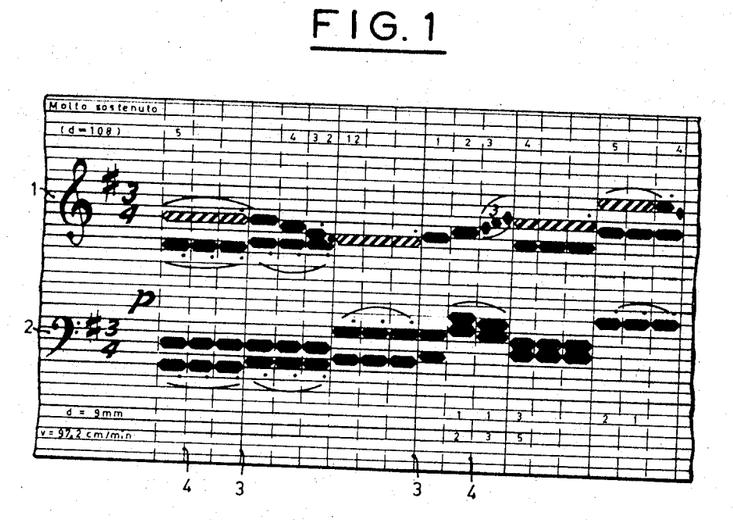
FIGURE 1 shows a fragment of a score according to the invention.

The score represented in FIGURE 1 consists of a ribbon of paper and plastic bearing two staves 1 and 2, one in the treble clef and the other in the bass clef. This stave is a piano stave.

Between the staves 1 and 2 are traced seven equidistant horizontal lines, enabling intermediate notes to be entered.

The assembly of these staves and these lines is divided vertically by full lines 3, the spacing of which defines, on the score, the extent of the measure or bar and by intermediate lines 4, defining the pulses of the bar. In the constructional example illustrated, the bar being a three-pulse measure, there are two lines 4 between each two consecutive lines 3, bounding three vertical strips of the same width.

The musical notes are inscribed on these staves by tracks of a length corresponding to their value, and the design of which is characteristic of the various kinds of notes.

Figure 2:
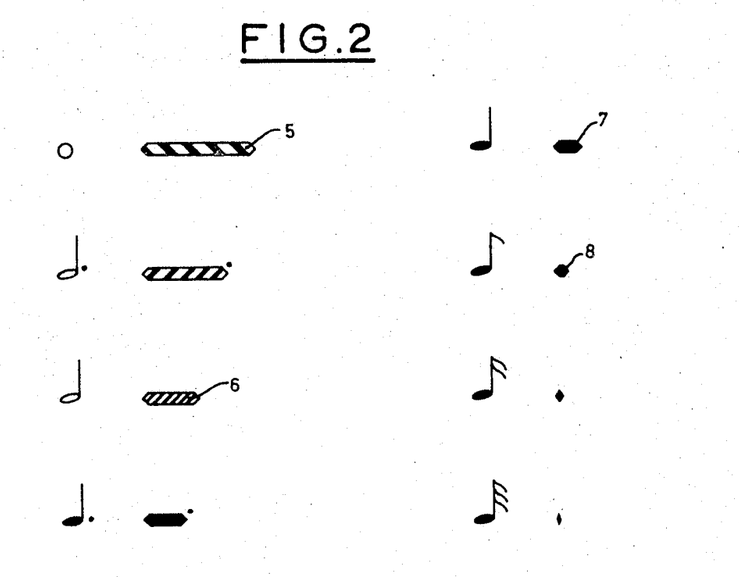
FIGURE 2 the code utilised for the realisation of the score of FIGURE 1.

Thus a semibreve is represented by a hatched track such as 5 in FIGURE 2, whereas a minim is constituted by a track 6 of a length equal to half the track 5 (a semibreve being equal to two minims) and the hatching lines are inclined in the opposite direction. A crochet is characterised by a black track 7 of a length equal to half the track of a minim; a quaver by a black track 8 of a length equal to half the black track 7, and so forth. In a general way, all the notes of values less than a minim are indicated by black tracks.

The dotted minims and the dotted crotchets are represented by tracks of lengths corresponding to one-and-a-half times those representing a minim and a crotchet respectively.

The other musical signs, such as rests, sharps, flats, naturals, slurs joining notes, and those indicating a crescendo and a diminuendo, are in every respect identical with those commonly used in writing music.

As illustrated, the tracks indicating notes extend throughout the length of the space corresponding to their duration, bounded by the lines 3 or 4, according to their value.

As a modification, the tracks may be of different colours according to the note that they are to represent.

Figure 3:
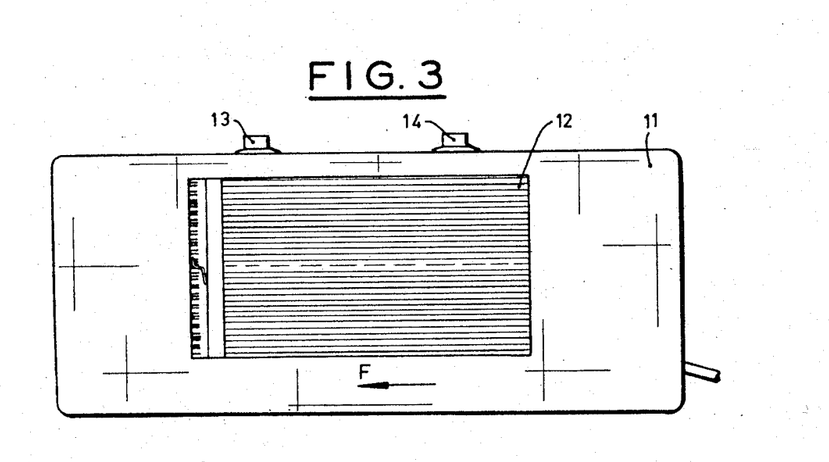
FIGURE 3 is a front view of a first embodiment of a device for deciphering the score of FIGURE 1.
Figure 4:
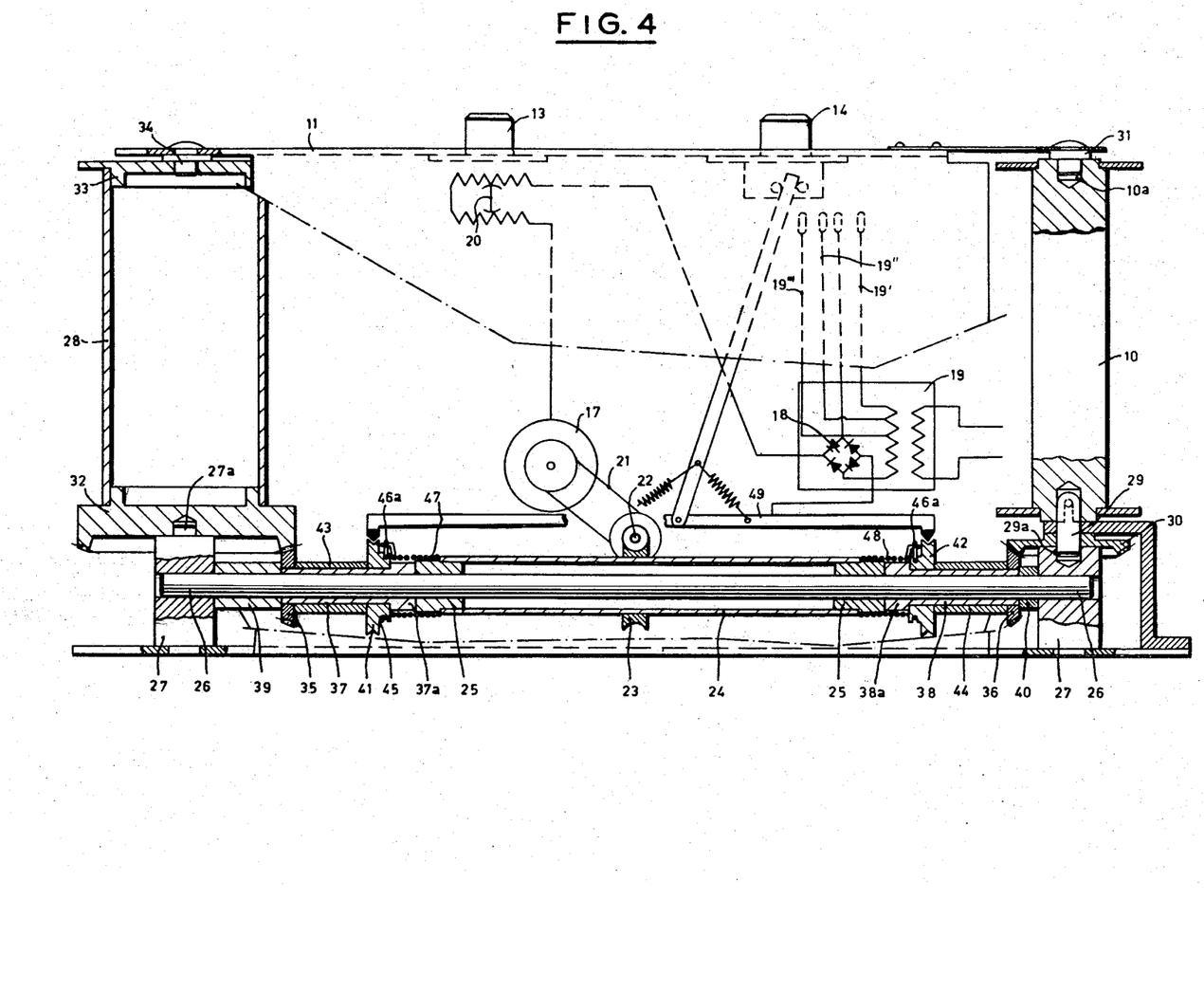
FIGURE 4 shows the mechanism of the device of FIGURE 3.

The band illustrated may be of a length up to 10 metres, and is wound upon a bobbin of the kind indicated at 10 in FIGURE 4. Such a score is designed to be utilised with the device illustrated in FIGURES 3 and 4, enabling the music to be read even by a person having no knowledge of this art. As illustrated, the band is more particularly designed to guide a pupil who is studying the piano. In a modification, not illustrated, the band might of course comprise only a single stave.

The production of scores of the kind illustrated in FIGURE 1 may be carried out by starting from a band bearing blank staves, the vertical division of which, defining the bars and the pulses, may be effected by means of suitable rubber stamps or stencils, different for each type of bar contemplated, and by means of various inking pads or printing blocks, the impressions of which would for instance be those indicated in FIGURE 2.

Figure 3A:
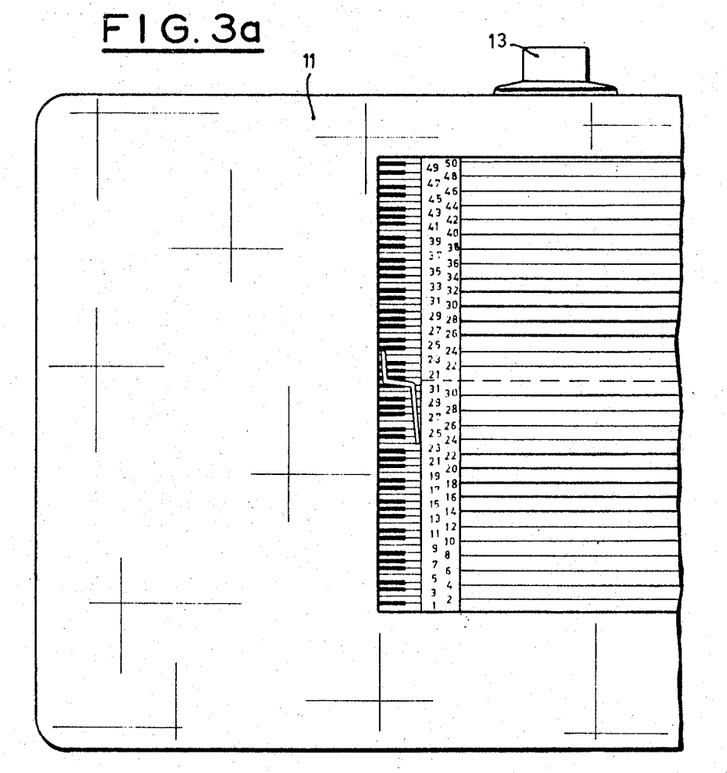
FIGURE 3a is a view of a detail of this device.

The reading or deciphering of the score described is effected by means of a device one embodiment of which is shown in FIGURES 3 and 4. This device comprises a casing 11, the front surface of which contains a rectangular window aperture 12, the height of which corresponds to the breadth of the scores to be deciphered, and upon the left-hand edge of which are inscribed, from the bottom to the top, the numerals from 1 to 50 (FIGURE 3a), representing, in the musical order, the fifty keys of a piano keyboard. These numerals are so arranged that when the band of FIGURE 1 is moving horizontally in the window 12, each numeral is arranged to register with that line of the staves upon which the corresponding note may be traced.

On the upper face of the casing 11 are arranged two lugs 13 and 14, one designed to control the change of direction of unrolling in relation to the left-hand edge of the window, and the other to control the change in the speed of unwinding. The mechanical and electrical means brought into play for effecting the driving of the band under the conditions set forth form the subject of FIGURE 4.

Figure 5:
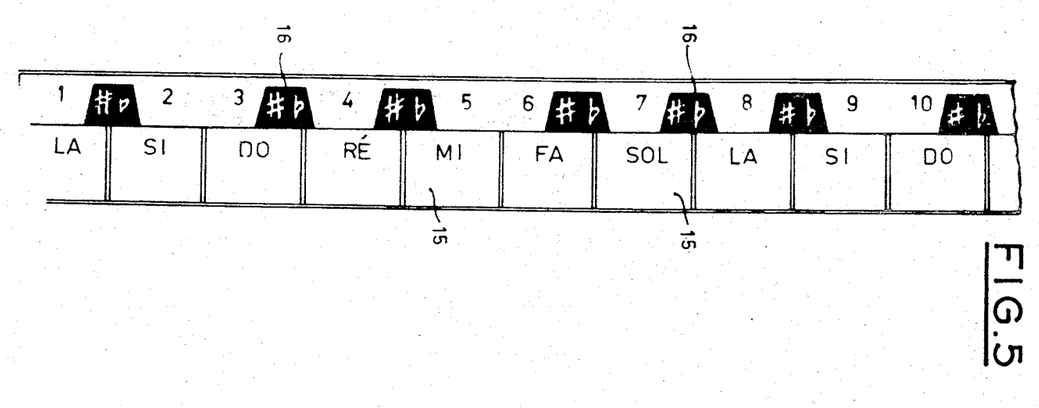
FIGURES 5 and 6 represent two forms of tabulations or diagrams, adapted to a piano and to a stringed instrument respectively that could be played by the use of the device of FIGURES 3 and 4.

The numerals from 1 to 50 that define the positioning of the note to be played on the keyboard of the piano are directly related to the keys of the piano or to a tablature or diagram represented in FIGURE 5, consisting of a rigid band or strip of a length corresponding to that of the keyboard, upon which the various white keys are diagrammatically indicated by rectangles 15, arranged side by side, while the black keys, corresponding to the sharpened or flattened notes of the keyboard, are indicated by black trapesiums 16. This diagram is arranged vertically along the read edge of the keyboard against the case of the piano.

Figure 6:
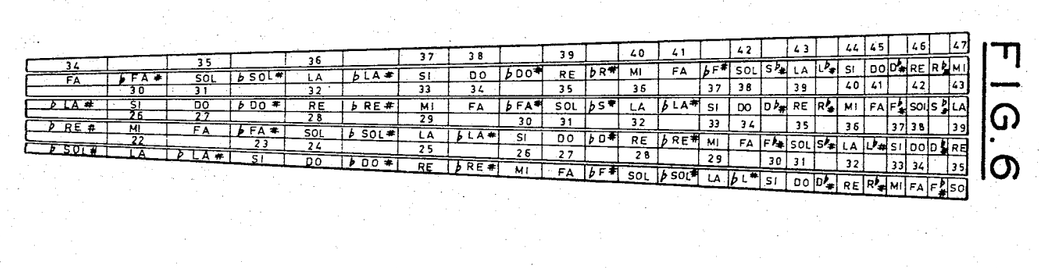

FIGURE 6 represents a tablature or diagram designed more particularly for stringed instruments. It is placed on the neck or finger-board of these instruments, below the strings.

The pupil desiring to play the piece inscribed on the musical score constituted by the ribbon 1 places this ribbon in the device shown in FIGURE 4, and causes it to unwind in the direction F in the window 12 of the device. He depresses the keys of the piano that are indicated by the passing of the tracks of the score before the corresponding numerals traced on the left-hand edge of the window 12, and maintains this during the entire duration of unwinding of each track.

It is evident that with such a device a pupil will acquire, much more easily than with the known methods, the sense of rhythm, and will be able to learn very quickly to read music. Such a device can of course equally be used to teach the playing of instruments other than the piano, particularly stringed instruments, such as the violin. FIGURE 6 shows the tablature or diagram that is designed to be fixed to the finger-board of a violin, underneath the strings.

The driving of the score past the window 12 is effected, in the device illustrated in FIGURE 4, by a continuous-current motor 17, supplied with current, through a rectifying unit 18, by a transformer 19, upon the secondary winding of which are arranged tappings or current-supply plugs 19', 19'' and 19''', changeable by the action of the lug 14, to enable the motor 17 to be supplied at different voltages, so as to vary the speed of revolution. 20 is a reversing switch associated with the lug 13, for changing the polarity of the current supplied to the motor whenever it is desired to reverse the direction of revolution.

The motor 17, through a belt 21, drives a worm 22, meshing with a worm wheel 23, keyed on to a tube 24, at the ends of which are engaged sleeves 25 forming the bearings of this tube. These sleeves are in fact engaged loosely upon a stationary shaft 26, fixed at each end to pillars 27 one designed to support the bobbin 10 and the other designed to support a bobbin 28, on to which the band is wound as it is unrolled from the bobbin 10.

At its lower end the bobbin 10 is in fact fixed to a peg 29, pivotally mounted in a cavity 29a in the column 27. To the body of the peg 29 is keyed a toothed wheel 30. At its upper end the bobbin 10 has an axial cavity 10a in which there engages a peg 31, fixed to the top wall of the casing 11.

The bobbin 28 is constituted by a cylindrical sleeve, at both ends of which are engaged flanges 32 and 33, the first of which, 32, is toothed, and is engaged by an axial aperture upon a peg 27a presented by the column 27. The flange 33 is pivotally mounted upon a peg fixed on the upper face of the casing 11 of the device.

The flange 32 and the wheel 30 are in mesh by their teeth with toothed plates 35 and 36, which are keyed to sockets 37 and 38 respectively, which are in contact by one end with the sleeves or sockets 25 and by their other ends with cylindrical spacing members 39 and 40. The parts 37a and 38a of the sockets 37 and 38 respectively, in contact with the sleeves 25, are of greater diameter than the rest of these sockets, but of slightly less diameter than the sleeves. These parts 37a and 38a form abutments for pulleys 41 and 42 respectively, mounted loose on the smaller-diameter portions of the sockets 37 and 38, and axially blocked by spacing tubes 43 and 44 respectively.

Figure 4A:
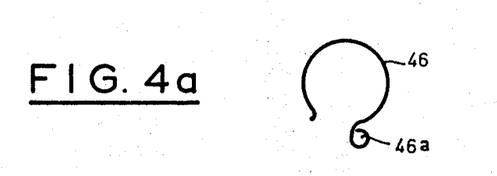
FIGURE 4a, a detail of this mechanism.

The pulleys 41 and 42 each comprise a cylindrical portion in which an annular groove 45 is hollowed out. In this groove there engages an annular spring 46 (FIGURE 4a), one end of which forms a loop 46a. In this loop 46a is engaged the end of a helical spring 47 or 48, fixed by its other end to the sleeve 25, and of an internal diameter corresponding to the external diameter of this sleeve, which is greater, as described, than the diameter of the part 37a of the socket 37, or of the part 38a of the socket 38. The opening of the spring 46 is such that this spring grips sufficiently upon the cylindrical portion of the pulley 41 or 42 to drive this pulley in rotation when the motor 17 is running.

When the pulleys 41 and 42 are prevented from turning, by the actuation for instance of a brake 49 initiated by the lug 14, and the motor 17 is turning, the springs 46 are rotated upon the cylindrical portions of these pulleys with sufficient force to occasion the tightening of the portions of the cylindrical springs 47 and 48 extending over the portions 37a and 38a of the sockets 37 and 38, so that these sockets are then rotated by the motor. The springs 47 and 48 serve in fact as resilient clutches. As soon as these sockets are driven, the movement is transmitted directly to the pulleys 28 and 10.

In the embodiment illustrated in FIGURES 3 and 4, the speed ratio of the bobbins 28 and 10 is about 4 to 1. In absolute value, the speed of the band may be varied as described by connecting the rectifier 18 to one or other of the plugs 19' to 19'''.

Figure 7:
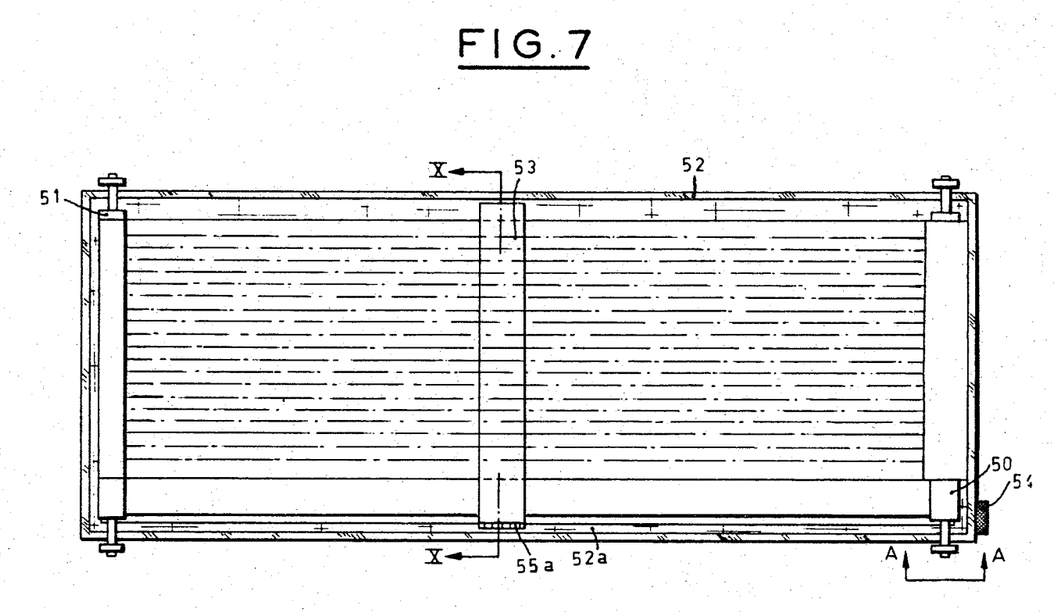
FIGURE 7 is a plan view of a device forming the subject of a second form of construction, likewise enabling the score of FIGURE 1 to be deciphered.
Figure 13:
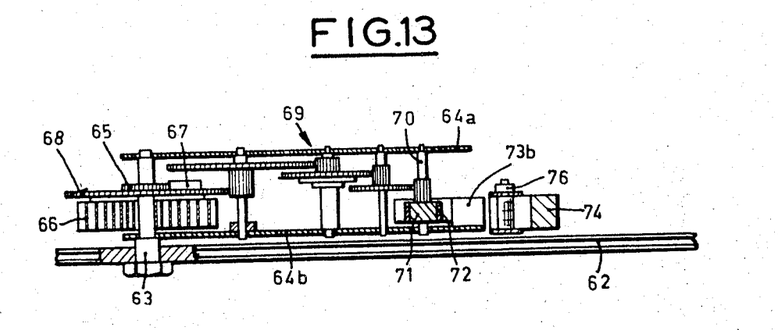
FIGURE 13 is a section on the line XIII—XIII in FIGURE 12.

In the apparatus forming the subject of the second form of construction of the invention, FIGURES 7 and 13, the score is unrolled from a cylinder 50 and wound up progressively, as the deciphering of a length of this score corresponding to the length of the apparatus proceeds, on to a second cylinder 51. The cylinders 50 and 51 are in fact pivotally mounted at the two ends of a casing 52, of parallelepiped form, before the upper face of which a graduated and numbered ruler 53 (FIGURE 11) is displaceable from left to right of the drawing. These graduations, fifty in number, correspond for instance to the fifty keys of a piano keyboard, and the space separating each of them is equal to half the distance between the various lines of the score of FIGURE 1. The graduation mark located between the numerals 21 and 31, exactly in the middle of the graduated scale borne by the ruler 53, is designed to enable the score to be correctly positioned on the apparatus, particularly by arranging this score to the right of this mark by its line which is exactly equidistant from the staves 1 and 2.

The speed of unwinding or of travel of the ruler 53 before the score can be regulated by actuating a control button 54 acting upon a regulating device hereinafter described.

Figure 8:
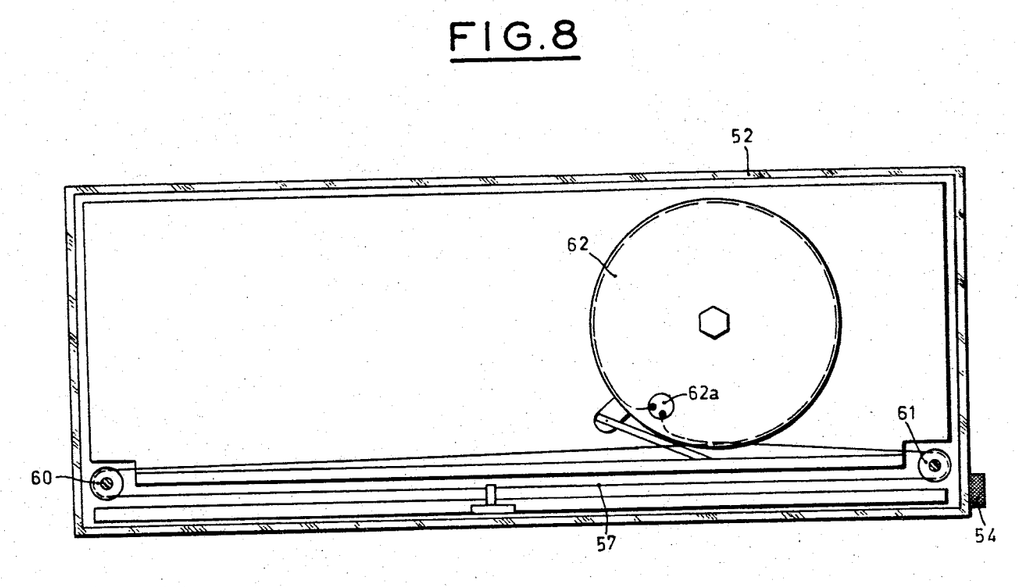
FIGURE 8 is a view similar to FIGURE 7, with part of its upper surface broken away.
Figure 9:
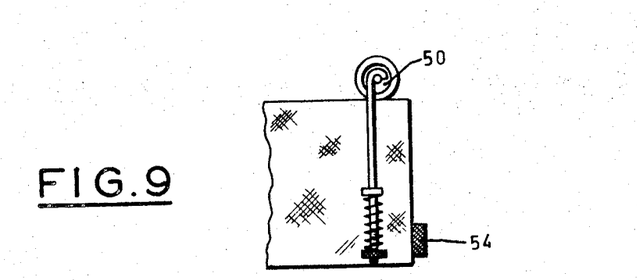
FIGURE 9 is a detail looked at in the direction A of FIGURE 7.
Figure 10:
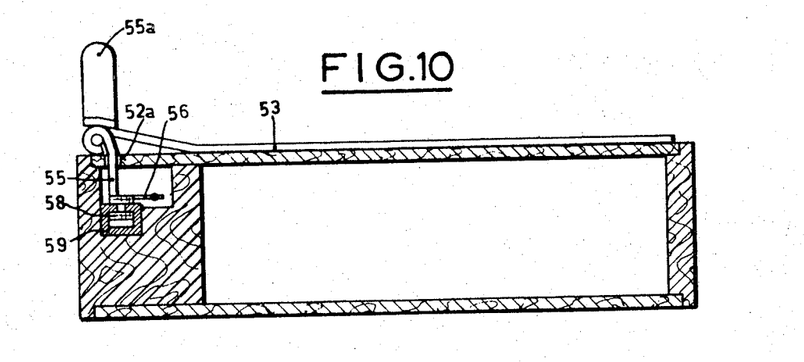
FIGURE 10 is a section on the line X—X in this same FIGURE 7.

As illustrated in FIGURE 10, the ruler 53 presents, at its left-hand end in this figure, a catch 55, substantially perpendicular to the ruler 53, engaging in a slot 52a, extending throughout the length of the casing 52 perpendicularly to the ruler. This catch comprises a support or bracket 56 for a traction wire 57 (FIGURE 8), and a head 58, by which it is in operative engagement with a guiding profile 59, fixed to the casing 52. To the catch 55 is also fixed a lug 55a, enabling the displacement fingers of the ruler to be controlled from right to left, particularly when it is desired to wind up the driving mechanism of the apparatus. The traction wire 57, which is fixed to the support 56, is stretched between two small pulleys 60 and 61, pivotally mounted on the casing 52, and is fixed by both its ends to a pulley 62, the diameter of which is such that the length of its peripheral groove corresponds exactly to the space capable of being traversed by the ruler 53 between the rollers 50 and 51. When this ruler is occupying one or the other of its end positions, one end of the traction wire 57 is wound upon the pulley 62, forming a single loop, and is fixed to the latter at 62a, the other end of this wire being directly fixed at 62a.

The pulley 62 is fixed to a spindle 63, pivoted between two plates 64a and 64b (FIGURE 13) of a clockwork spring movement comprising a toothed pinion 65 fixed to the spindle 63, a spiral spring 66, one end of which is fixed to this spindle, whilst its other end is fixed to the plate 64b by a peg, not shown, a pawl 67, formed by a resilient blade fixed to a plate 68 mounted loose on the spindle 63, and a multiplying wheelwork indicated by 69 and designed for the driving of a spindle 70, to which is keyed a cylindrical weight 71, of magnetisable material, covered with a coating of copper 72. This coating, in a modification, might be a coating of aluminium, or of any other non-magnetisable metal. The assembly formed by the weight 71 and the coating 72 turns between two parallel armatures 73a and 73b (FIGURE 12) of magnetisable material in the interior of which there circulates a magnetic field, which is transmitted to them by a U-shaped permanent magnet 74, extending, by its limbs, into alignment with the armatures 73a and 73b. This magnet 74 is mounted at the end of a lever 75, articulated to the plate 64b at 76, its free end being fixed to a stem 77 capable of being displaced axially by rotation of the control button 54.

By the actuation of this button, on which depends the rocking of the lever 75, it is therefore possible to vary the distance between the ends of hte limbs of the magnet 74 and the armatures 73a and 73b. The more or less considerable augmentation of the air-gap thus constituted determines a corresponding variation in the strength of the flux traversing the armatures. The same applies to the strength of the flux passing from one armature to the other through the weight 71, and above all through the copper coating 72, in which, in a known manner, Foucault currents are produced, the strength of which, as is known, varies as the square of the flux. The effect of such currents is well known, and is expressed by the production of a tangential force, the direction of which is a function of the polarity of the active flux. In the apparatus according to the invention this polarity is such that the force resulting from the Foucault currents opposes the driving of the weight 71 and its coating by the spring mechanism.

The demultiplication given to the button 54 is particularly fine, so that it is possible to vary the speed of unwinding of the ruler 53 in front of the score fixed to the casing 52 with very great fineness and over very wide limits.

Furthermore, with this button is associated a datum, not illustrated, which moves in front of a graduated scale, likewise not illustrated, which enables the unwinding speed to be adjusted with precision.

Figures 11, 12:
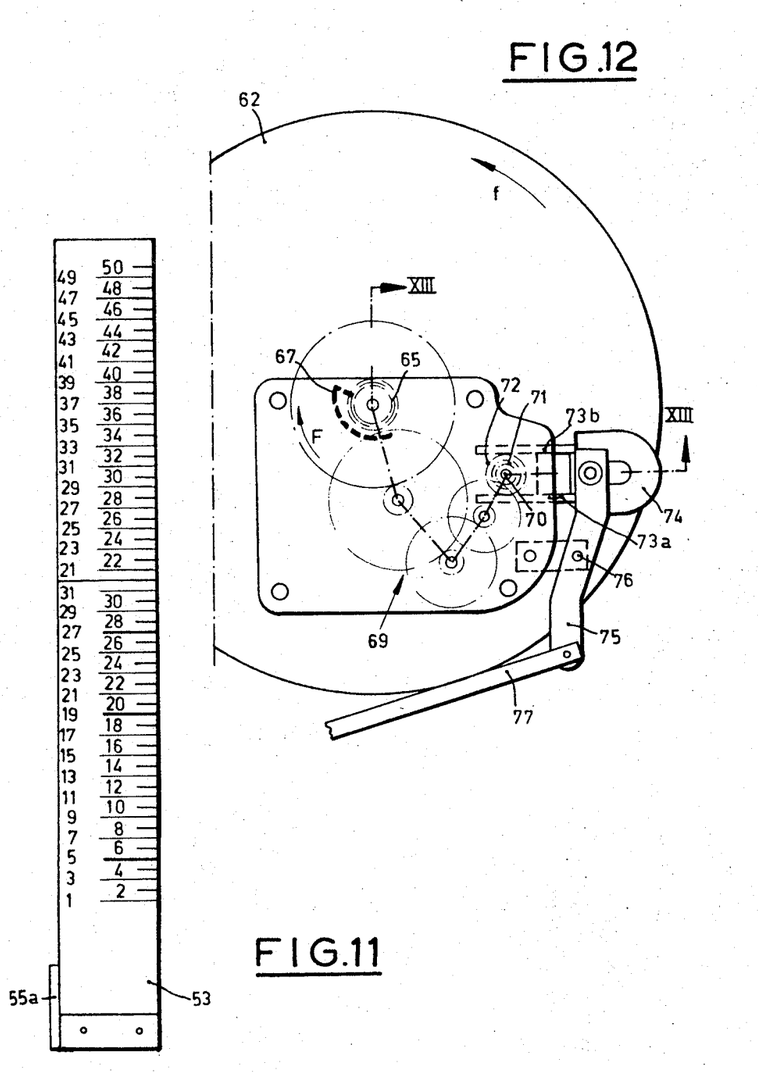
FIGURE 11 is a view in elevation of a detail on a much larger scale.
FIGURE 12 is a view from below of the driving mechanism of the apparatus.

The winding up of the spring 66 is effected as described, by manually displacing, from right to left of FIGURE 7, the cursor 53, which has the result of driving the pulley 62 in the direction f (FIGURE 12). When this pulley is displaced in this direction, the end of the pawl 67 jumps over the teeth of the pinion 65. The spring 66 can thus be stretched without the wheelwork 69 being driven.

As soon as the spring 66 is stretched, and the cursor 53 is released, the pawl 67 comes into engagement with the teeth of the pinion 65, and the plate 68, on which the driving of the wheelwork 69 and of the weight 71 depends, is driven in the direction F.

The invention is not of course limited to what has been described and illustrated in the drawings. In particular, it will be understood that the invention is in no way limited into that one of its modes of application, or to those of the forms of construction of its various parts, that have been more particularly indicated, and that on the contrary it embraces all possible modifications that would bring into operation the inventive concepts of the invention.

I claim:

1. Apparatus for teaching the playing of a musical instrument comprising a frame, an elongated horizontal band extending lengthwise of said frame, a plurality of spaced parallel lines extending lengthwise of said band and defining at least one musical stave, a plurality of tracks of different position and different length on said stave representing different notes of a score by their position on said stave and representing different note values by their lengths, a plurality of transverse lines on said band defining measures and beats, a vertical reference member transversely overlying said band, a series of indicia on said reference member coinciding respectively with the lines and spaces of said stave and indicating points of actuation of the instrument to be played, means for producing relative movement of said band and reference member in a direction lengthwise of said band, means for regulating the velocity of said relative movement in accordance with the tempo of the music represented by said notes on said stave, and an indicating member applied to the instrument to be played and having adjacent the respective points of actuation of said instrument indicia corresponding to the indicia of said reference member, to assist the player in locating the points of actuation of said instruments corresponding to the notes of the score represented by said tracks on said band, the width of said band and length of said reference member being less than the length of said indicating member.

2. Apparatus according to claim 1, in which said means for producing relative movement of said band and reference member comprises spaced parallel rollers on which band is wound and means for driving said rollers comprising a motor, spring clutch means for selectively connecting said motor with said rollers, means for reversing the direction of rotation of said rollers and means for varying the speed at which said rollers are driven by said motor.

3. Apparatus according to claim 1 in which said means for producing relative movement of said band and reference member comprises a traction line extending lengthwise of said frame, means for guiding said reference member for movement lengthwise of said frame, means for releasably securing said reference member to said traction line, rollers guiding and supporting said traction line, a driving pulley on which said traction line is engaged, driving means exerting a torque on said driving pulley to tend to rotate it and thereby move said traction line and reference member lengthwise of the frame and speed control means in driving connection with said pulley to regulate the speed at which said pulley is rotated by said driving means.

4. Apparatus according to claim 3, in which said speed control means comprises a rotatable armature including electrically conductive portion providing a closed circuit path, means providing a magnetic field encompassing said armature whereby rotation of said armature generates electrical currents in said circuit path and means for selectively varying the strength of said magnetic field.

5. Apparatus according to claim 1, in which said indicating member comprises an elongated strip adapted to underlie the strings of a stringed instrument and bearing indicia indicating finger positions corresponding to the notes represented by said tracks on said band.

(References on following page)

References Cited

UNITED STATES PATENTS

| | | | |
|---|---|---|---|
| 561,805 | 6/1896 | Morgan | 84—483 |
| 585,681 | 7/1897 | Latta | 84—484 |
| 855,636 | 6/1907 | Howell | 84—483 |
| 996,071 | 6/1911 | Fessia | 84—483 |
| 1,229,257 | 6/1917 | Haanel | 84—483 |
| 1,515,403 | 11/1924 | Ohlsen | 84—483 |
| 1,544,426 | 6/1925 | Blum | 84—483 |
| 1,571,110 | 1/1926 | Ebert et al. | 84—484 |
| 1,664,010 | 3/1928 | Welch | 84—484 |
| 1,838,284 | 12/1931 | Refsgaard | 84—483 |
| 2,322,465 | 1/1943 | Mihailoff | 84—485 |
| 2,483,570 | 10/1949 | Bergey | 84—484 |
| 3,128,665 | 4/1964 | Kylin et al. | 84—484 |

FOREIGN PATENTS

| | | |
|---|---|---|
| 582,164 | 12/1924 | France. |
| 1,317,439 | 1/1963 | France. |
| 339,067 | 4/1936 | Italy. |

RICHARD B. WILKINSON, *Primary Examiner.*

C. M. OVERBEY, *Assistant Examiner.*